J. M. KERR.
SHOCK ABSORBER.
APPLICATION FILED MAR. 11, 1922.
1,419,630.
Patented June 13, 1922.
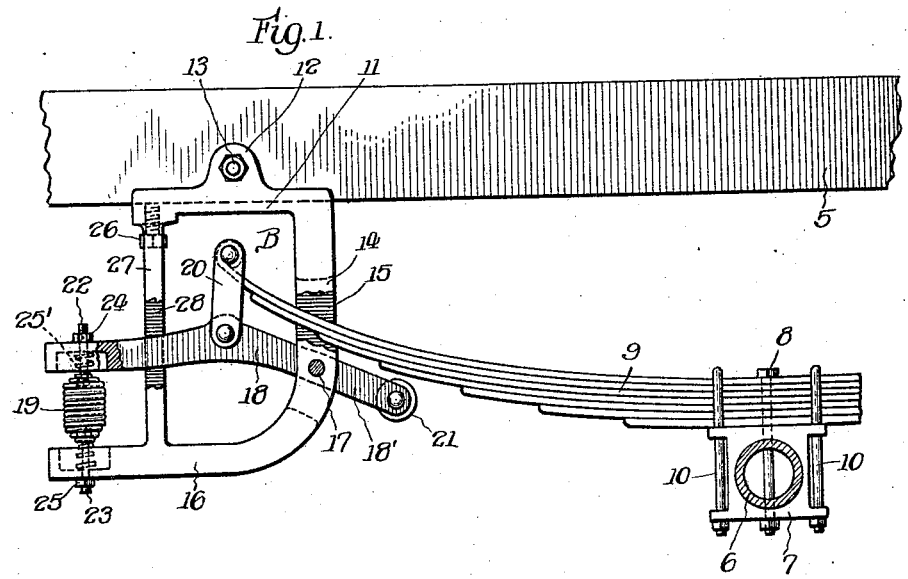
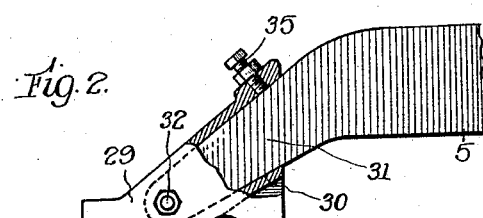
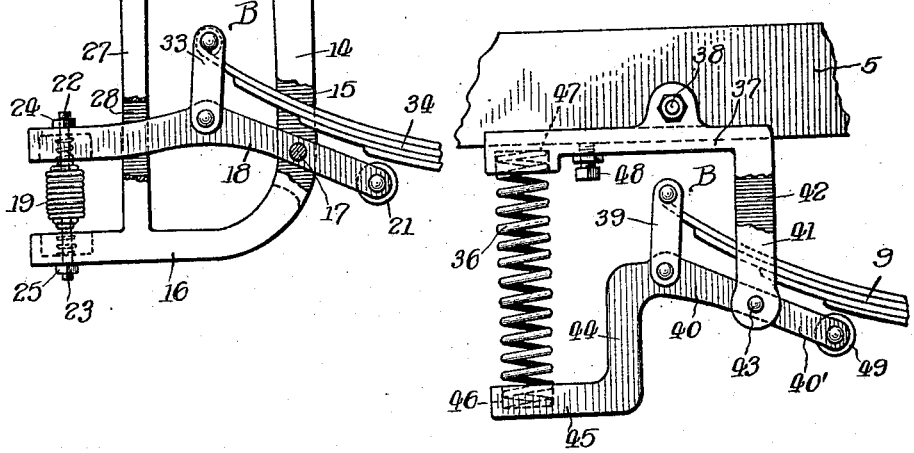
Inventor:
James M. Kerr,
By Charles J. Schmidt.
Atty.
Witness:
A. J. Sauser.

UNITED STATES PATENT OFFICE.

JAMES M. KERR, OF CRAWFORDSVILLE, INDIANA.

SHOCK ABSORBER.

1,419,630. Specification of Letters Patent. Patented June 13, 1922.

Application filed March 11, 1922. Serial No. 542,862.

*To all whom it may concern:*

Be it known that I, JAMES M. KERR, a citizen of the United States, and a resident of Crawfordsville, in the county of Montgomery and State of Indiana, have invented certain new and useful Improvements in Shock Absorbers, of which the following is a specification.

My invention relates to shock absorbers which are particularly adaptable in association with semi-elliptical or quarter-elliptical side springs of vehicles for absorbing the shocks incident to ordinary travel of the vehicles and more especially for absorbing shocks which would otherwise be occasioned by sudden throws of the body or the axle structure, or recoil of the vehicle springs.

My improved shock absorbing mechanism and its application to a vehicle are clearly illustrated on the accompanying drawing, in which Fig. 1 is a side elevational view at the front end of a vehicle showing the shock absorbing mechanism attached.

Fig. 2 is a side elevational view at the rear end of the vehicle showing shock absorbing mechanism attached, and Fig. 3 shows a modified arrangement.

On the drawing the side beam of the vehicle chassis is indicated by 5 and the front axle by 6. A fitting 7 receives the axle and is secured thereto by the bolt 8, the front spring 9 of the vehicle being supported on this fitting and held thereto by strap bolts 10 in the well known manner, the inner end of the spring being connected with the vehicle frame either directly or through a shackle (not shown). Above the end of the spring a bracket structure B is secured to the beam 5. The bracket shown has the base 11 which is side flanged to receive the lower edge of the beam and which has side ears through which extends the bolt 13 that originally received the shackle which supported the end of the spring 9 from the beam. At its inner end the base of the bracket has the downwardly extending spaced apart arms 14 and 15 between which extends the end of the spring 9. The lower horizontal arm 16 of the bracket extends forwardly. Below the spring 9 the arms 14 and 15 secure a pivot pin 17 which fulcrums the shock absorber lever 18 near its inner end, the lever extending outwardly over the bracket arm 16 and being connected at its outer end by the shock absorber spring 19 with the outer end of the arm. Intermediate its outer end and its fulcrum point the lever is connected by the shackle 20 with the end of the spring 9, and this shackle may be the one which originally connected the end of the vehicle spring with the beam 5. When the shock absorbing mechanism is to be applied the shackle is merely disconnected from the side beam and swung downwardly and secured to the lever 18. The inner end 18' of the lever 18 journals a roller 21 which is preferably of some elastic material such as rubber, this roller extending across and below the spring 9.

The shock absorber spring 19 shown in Figs. 1 and 2 is of the expansion type and as shown its ends are secured to the heads of bolts 22 and 23 extending through the outer ends of the lever 18 and bracket arm 16 respectively, the bolts receiving the nuts 24 and 25. By means of the bolts and nuts the spring can be adjusted to give the desired tension during operation of the shock absorber mechanism. To prevent rattling of the spring and loosening of the bolts when the spring is relaxed I preferably interpose spring washers 25' between the spring ends and the lever 18 and arm 16 respectively.

To secure the bracket rigidly to the beam 5 I provide a set screw 26 at the outer end of the base 11 for engaging against the beam side, and to strengthen the bracket structure cross arms or braces 27 and 28 may be extended between the outer end of the base 11 and the bracket arm 16 as clearly shown, the lever 18 extending outwardly between the braces as clearly shown.

In the arrangement of Fig. 2 which shows the shock absorber mechanism applied to the rear end of the vehicle the construction is exactly the same as that shown in Fig. 1 except that the base 29 of the bracket structure has the inclined pocket or socket 30 for receiving the downwardly deflected end 31 of the chassis side beam 5. The bracket is held in place by the bolt 32 that originally received the shackle 33 but which now connects the vehicle spring 34 with the lever 18. A set screw 35 may be provided to assist the bolt 32 in rigidly holding the bracket structure to the beam.

In the modified arrangement shown in Fig. 3 the arrangement is substantially the same as that shown in Fig. 2 except that a compression shock absorber spring 36 is used instead of an expansion spring. The base 37 of the bracket structure is secured to the chassis beam 5 by the bolt 38 that originally received the shackle 39 which now connects the spring 9 with lever 40. The downwardly extending arms 41 and 42 of the bracket structure secure at their lower ends the pivot pin 43 on which the lever is fulcrumed, the lever being connected outside of the fulcrum point with the shackle 39. Outside of the shackle connection the lever has the downwardly extending section 44 and the outwardly extending horizontal arm 45. Between the arm 45 and the outer end of the bracket base 37 the compression spring is inserted, pockets 46 and 47 being provided in the lever and bracket respectively for accommodating the spring ends. A set screw 48 extends through the base of the bracket and engages against the beam 5 to assist the bolt 38 in rigidly holding the bracket in position. The inner extension 40′ of the lever has the rubber roller 49 journaled thereon below the spring 9.

Describing now the operation, the vehicle body and axle structure approach and recede from each other during travel of the vehicle.

Let us consider first the operation during approach of the vehicle body and axle. When the wheel strikes an elevation in the roadway the axle with its spring is raised toward the vehicle body, and the shock absorber lever on account of its shackle connection with the spring will be rotated in clockwise direction around its fulcrumed point, the shock absorbing spring 19 being expanded to gradually absorb most if not all of the shock of wheel impact. If any impact pressure is left after functioning of the shock absorber spring it will be taken up by the vehicle spring. Upward movement of the axle is thus gradually communicated to the vehicle body, the bumps, jolts and shocks being taken up in greater part and absorbed by the shock absorber springs.

When the vehicle body and axle separate, as when the wheel drops into a depression, pressure is released from the vehicle spring which relaxes. Sudden relaxation or recoil of the spring is prevented by the shock absorber spring, the relaxing vehicle spring when curving up causing swing of the lever and expansion of the shock absorber spring. The recoil of the vehicle spring is thus absorbed by the shock absorber spring and does not reach the vehicle body. The rubber roller 21 also functions efficiently during recoil of the vehicle spring. When the spring is under more or less pressure the roller will be disconnected therefrom, but when it curls up after being released from pressure it will engage and press against the roller and such pressure will cause swing of the shock absorber lever in direction to cause expansion of the shock absorbing spring. Relaxation or recoil movement of the vehicle spring thus causes upward pull on the lever at the shackle and downward pressure on the lever at the roller, and expansion of the shock absorber spring.

If the vehicle wheel continues along a lower level after having dropped from a higher level the body will eventually follow and drop heavily onto the spring, and then recoil movement of the excessively flattened vehicle spring will tend to throw the body upwardly. My improved shock absorbing mechanism takes good care of this condition. When the body moves upwardly away from the axle after a sudden drop thereof the vehicle spring and shock absorber spring are released and the shock absorbing spring contracts and the vehicle spring relaxes until the roller engages the vehicle spring. The lever will then be pulled upwardly at the shackle and pressed downwardly at the roller and swung in clockwise direction to again expand the shock absorber spring which then functions to gradually retard and snub the body upthrow.

When pressure is applied to the vehicle spring, as when the body moves downwardly, the spring flattens, and such flattening would tend to swing down the shock absorber lever in counter clockwise direction. However such effect is neutralized by the swing of the shackle from practically vertical position to inclined position which will shorten the vertical distance between the connections of the shackle with the spring and lever.

The operation of the arrangement shown in Fig. 3 is exactly the same as that for the mechanism of Figs. 1 and 2 except that the shock absorbing spring functions by compression instead of by expansion. It is conceivable that instead of using springs as the shock absorbing element hydraulic or pneumatic means might be substituted.

I thus provide a simple, practical and durable shock absorber mechanism which can be readily applied to a vehicle without changing its construction or any of its parts and which will function with equal efficiency to absorb shocks on the down travel of the body and the upward travel thereof. I do not desire to be limited to the exact construction, arrangement and operation shown and described as changes and modifications are possible which would still come within the scope of the appended claims.

Having described my invention, I claim as follows:

1. In a vehicle, the combination with the vehicle body, the axle, and a leaf spring secured to the axle and extending outwardly below the body side, of a bracket structure secured by its base to the body, an arm extending downwardly from the bracket base, a lever fulcrumed on said arm below the spring and extending outwardly, a connection between the end of said spring and said lever intermediate the fulcrum point of the lever and the outer end thereof, an elastic member connected between said bracket and the outer end of said lever for resisting swing of the lever, and an abutment on the inner end of said lever below said spring, said spring when relaxing engaging with said abutment to cause swing of the lever against the resistance of said elastic member whereby recoil of the spring is retarded.

2. In a vehicle, the combination with a side beam, an axle, and a leaf spring secured to the axle and extending below said side beam, a bracket structure secured to the side beam and having a downwardly extending arm, the outer end of said spring extending outwardly of said arm, a lever fulcrumed on said arm and extending outwardly, a connection between said lever and the end of the spring, an elastic connection between the end of the lever and bracket, and an abutment on the inner end of the lever below the spring, said abutment being engaged by the spring when it relaxes and the connection from the spring to the lever being raised when the spring relaxes, said abutting and raising movements cooperating to swing the lever against the resistance of said elastic member.

3. In a vehicle, the combination with the side beam, the axle, and a leaf spring secured to the axle and extending outwardly in alignment with the side beam, of a supporting base secured to said side beam above the spring end, spaced apart arms extending downwardly from the inner end of said base, the end of said spring extending between said arms and terminating below the base, a lever below the spring extending between said arms and fulcrumed to the arms, a shackle connecting between the end of said spring and said lever outwardly of the lever fulcrum, an outward extension at the lower end of said arm, an elastic member connected between said extension and the outer end of said lever for resisting swing of the lever, and an abutment roller on the inner end of said lever below said spring, said roller being engaged by the spring when the spring relaxes during upthrow of the vehicle body, such abutment causing swing of the lever against the resistance of said elastic member whereby the upthrow is retarded.

4. In a vehicle, the combination with the vehicle body, the axle, and a leaf spring secured to the axle and extending outwardly, of a bracket structure secured to the body, a lever fulcrumed on said bracket structure below the spring, a connection between the end of said spring and said lever at a point outside of its fulcrum point, an elastic member connected between the outer end of said lever and said bracket structure, and an abutment on the inner end of said lever below said spring, said lever being swung against the resistance of said elastic member when the body and axle approach, and said abutment being engaged by the spring to swing the lever against the resistance of said elastic member when said body and axle separate.

5. In a vehicle, the combination with the vehicle body, an axle, and a leaf spring secured to the axle and extending outwardly below the body, of a supporting base secured to the body above the end of the spring, arms extending downwardly from the inner end of said base, the end of said spring extending outwardly between said arms, a lever extending between said arms below said spring and fulcrumed thereto, a shackle connecting the end of said spring with said lever outside of the lever fulcrum, an extension extending outwardly from the lower end of said arms below the outer end of said lever, an elastic member between said extension and the outer end of the lever, and a brace extending between the outer end of said base and said extension, said elastic member resisting swing of the lever when the body and axle approach and also resisting swing of the lever when the spring relaxes.

6. In a vehicle, the combination with the vehicle body, an axle, and a leaf spring secured to the axle and extending outwardly in registration with the body side, of a supporting base secured to the body above the spring end, an arm extending downwardly from the inner end of said base, the end of the spring extending in front of said arm, a lever fulcrumed to the arm below said spring, a connection between the end of said spring and said lever in front of the lever fulcrum point, a forward extension on said arm at the lower end thereof and below the front end of the lever, an elastic member connecting between said extension and the front end of the lever, said elastic member resisting swing of the lever when the body and axle separate, and an abutment on the inner end of said lever below said spring, relaxation of said spring during separation of the body and axle causing swing of said lever by virtue of the direct connection of the spring therewith, and relaxation of said spring causing engagement thereof with said abutment and swing of the lever.

7. In a vehicle, the combination with the vehicle body, the axle, and a leaf spring secured to the axle and extending outwardly, of a bracket structure secured to the body, a lever fulcrumed on said bracket structure, a connection between the end of said spring and said lever at a point outside of its fulcrum point, and an elastic member between the outer end of said lever and said bracket structure, said lever at its inner end being extended below the spring to be engaged thereby and swung against the resistance of said elastic member when the body and axle separate.

In witness whereof, I hereunto subscribe my name this 7" day of March A. D., 1922.

JAMES M. KERR.